(12) United States Patent
Shimizu

(10) Patent No.: US 10,011,077 B2
(45) Date of Patent: Jul. 3, 2018

(54) LAMINATE SHAPING APPARATUS AND NON-TRANSITORY COMPUTER READABLE MEDIUM STORING PROGRAM

(71) Applicant: FUJI XEROX CO., LTD., Tokyo (JP)

(72) Inventor: Keishi Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 628 days.

(21) Appl. No.: 14/604,227

(22) Filed: Jan. 23, 2015

(65) Prior Publication Data
US 2016/0052211 A1 Feb. 25, 2016

(30) Foreign Application Priority Data
Aug. 25, 2014 (JP) .................... 2014-170453

(51) Int. Cl.
| | |
|---|---|
| *B29C 67/00* | (2017.01) |
| *B33Y 50/02* | (2015.01) |
| *B29C 64/386* | (2017.01) |
| *B29C 64/112* | (2017.01) |
| *B29C 64/393* | (2017.01) |
| *B29C 64/129* | (2017.01) |
| *B33Y 10/00* | (2015.01) |

(52) U.S. Cl.
CPC ........ *B29C 67/0088* (2013.01); *B29C 64/112* (2017.08); *B29C 64/129* (2017.08); *B29C 64/386* (2017.08); *B29C 64/393* (2017.08); *B29C 67/007* (2013.01); *B29C 67/0059* (2013.01); *B33Y 10/00* (2014.12); *B33Y 50/02* (2014.12)

(58) Field of Classification Search
CPC ............ B29C 67/0088; B29C 67/0059; B29C 67/007; B29C 64/386; B29C 64/112; B29C 64/129; B29C 64/393
USPC ....................................... 425/174.4
See application file for complete search history.

(56) References Cited

U.S. PATENT DOCUMENTS

| | | | |
|---|---|---|---|
| 5,059,266 A | 10/1991 | Yamane et al. | |
| 5,594,652 A * | 1/1997 | Penn | ............ B29C 67/0059 345/419 |
| 5,668,894 A * | 9/1997 | Hamano | ............... G06T 5/30 345/442 |

(Continued)

FOREIGN PATENT DOCUMENTS

| | | |
|---|---|---|
| JP | H03-039234 A | 2/1991 |
| JP | 2004-291625 A | 10/2004 |
| JP | 2004-330702 A | 11/2004 |

*Primary Examiner* — Alison L Hindenlang
*Assistant Examiner* — Emmanuel S Luk
(74) *Attorney, Agent, or Firm* — Oliff PLC

(57) ABSTRACT

Provided is a laminate shaping apparatus including an ultraviolet-ray source that applies ultraviolet rays a model material ejecting unit that ejects an ultraviolet curable model material a support material ejecting unit that ejects an ultraviolet curable support material which assists shaping of a three-dimensional shaped product which is shaped by the model material a driving unit that drives at least one of the ultraviolet-ray source, the model material ejecting unit, and the support material ejecting unit, and a shaping stand on which the three-dimensional shaped product is shaped, and a control unit that controls the model material ejecting unit, the ultraviolet-ray source, the driving unit, and the support material ejecting unit.

19 Claims, 8 Drawing Sheets

(56) References Cited

U.S. PATENT DOCUMENTS

| | | | | |
|---|---|---|---|---|
| 6,169,605 B1* | 1/2001 | Penn | B29C 67/0059 | 358/1.1 |
| 7,500,846 B2* | 3/2009 | Eshed | B29C 67/0059 | 264/113 |
| 7,680,555 B2* | 3/2010 | Dunn | B29C 64/386 | 33/613 |
| 7,725,209 B2* | 5/2010 | Menchik | B29C 67/0059 | 347/86 |
| 7,962,237 B2* | 6/2011 | Kritchman | B29C 67/0059 | 347/237 |
| 8,050,786 B2* | 11/2011 | Holzwarth | G06F 17/50 | 700/118 |
| 8,318,076 B2* | 11/2012 | Wang | B33Y 10/00 | 264/401 |
| 8,883,392 B2* | 11/2014 | Napadensky | B29C 67/0059 | 430/263 |
| 8,888,480 B2* | 11/2014 | Yoo | B29C 67/0081 | 264/113 |
| 9,067,446 B1* | 6/2015 | Moore | B41J 2/16535 | |
| 9,079,440 B1* | 7/2015 | Bonino | B41J 29/393 | |
| 9,302,518 B2* | 4/2016 | Warner | B41J 2/17509 | |
| 9,302,519 B1* | 4/2016 | Clark | B29C 64/112 | |
| 9,415,546 B2* | 8/2016 | Conrow | B29C 67/0088 | |
| 9,463,614 B2* | 10/2016 | Okamoto | B29C 67/0092 | |
| 9,481,162 B2* | 11/2016 | Okamoto | B29C 67/0059 | |
| 2002/0104973 A1* | 8/2002 | Kerekes | B29C 67/0059 | 250/559.2 |
| 2004/0175451 A1 | 9/2004 | Maekawa et al. | | |
| 2006/0111807 A1* | 5/2006 | Gothait | B29C 67/0059 | 700/119 |
| 2007/0176312 A1* | 8/2007 | Clark | B22F 3/1055 | 264/40.1 |
| 2009/0167817 A1* | 7/2009 | Orr | B41J 3/4073 | 347/37 |
| 2011/0180971 A1* | 7/2011 | Vagt | B22F 3/1055 | 264/401 |
| 2013/0101803 A1* | 4/2013 | Grebe | B29C 67/007 | 428/172 |
| 2013/0307194 A1* | 11/2013 | Elsey | B29C 67/0059 | 264/401 |
| 2014/0110872 A1* | 4/2014 | Levy | B29C 67/0062 | 264/40.1 |
| 2014/0252668 A1* | 9/2014 | Austin | B28B 3/20 | 264/40.7 |
| 2015/0088292 A1* | 3/2015 | Inoue | B29C 67/0088 | 700/98 |
| 2015/0130100 A1* | 5/2015 | Fiegener | B29C 67/0088 | 264/40.1 |
| 2015/0134095 A1* | 5/2015 | Hemani | G06T 19/00 | 700/98 |
| 2015/0210011 A1* | 7/2015 | Conrow | B29C 67/0088 | 264/40.4 |
| 2015/0273857 A1* | 10/2015 | Derleth | B41J 2/16579 | 347/19 |
| 2015/0301517 A1* | 10/2015 | Chen | G05B 19/4099 | 700/118 |
| 2015/0352781 A1* | 12/2015 | Hosier | B29C 67/0059 | 425/150 |
| 2016/0211116 A1* | 7/2016 | Lock | H01J 37/304 | |
| 2016/0214323 A1* | 7/2016 | Mizes | B29C 67/0088 | |
| 2016/0229222 A1* | 8/2016 | Stecker | B29C 67/0059 | |
| 2016/0271881 A1* | 9/2016 | Bostick | B29C 67/0088 | |
| 2016/0318258 A1* | 11/2016 | Valade | B29C 67/0088 | |
| 2017/0057161 A1* | 3/2017 | Kuk | B29C 67/0059 | |
| 2017/0057171 A1* | 3/2017 | Chang | B29C 67/0088 | |
| 2017/0066192 A1* | 3/2017 | Cho | G01B 11/2513 | |
| 2017/0072644 A1* | 3/2017 | Ng | B29C 67/0088 | |
| 2017/0095975 A1* | 4/2017 | Folkins | B29C 67/0059 | |
| 2017/0100894 A1* | 4/2017 | Burns | B29C 67/0088 | |
| 2017/0151723 A1* | 6/2017 | Yoo | B29C 67/0081 | |
| 2017/0239892 A1* | 8/2017 | Buller | B29C 67/0088 | |
| 2017/0246809 A1* | 8/2017 | Starr | B29C 67/0088 | |
| 2017/0368752 A1* | 12/2017 | Shelhart | B33Y 10/00 | |

* cited by examiner

LAMINATE SHAPING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2014-170453 filed Aug. 25, 2014.

BACKGROUND

Technical Field

The present invention relates to a laminate shaping apparatus and a non-transitory computer readable medium storing a program.

SUMMARY

According to an aspect of the invention, there is provided a laminate shaping apparatus including:
an ultraviolet-ray source that applies ultraviolet rays;
a model material ejecting unit that ejects an ultraviolet curable model material;
a support material ejecting unit that ejects an ultraviolet curable support material which assists shaping of a three-dimensional shaped product which is shaped by the model material;
a driving unit that drives at least one of the ultraviolet-ray source, the model material ejecting unit, and the support material ejecting unit, and a shaping stand on which the three-dimensional shaped product is shaped; and
a control unit that controls the model material ejecting unit, the ultraviolet-ray source, and the driving unit so that the model material is laminated on the shaping stand and is cured according to shaping data of the three-dimensional shaped product, and that controls the support material ejecting unit so that the support material is ejected to cause a height difference of the three-dimensional shaped product to be a predefined threshold value or smaller.

BRIEF DESCRIPTION OF THE DRAWINGS

Exemplary embodiments of the present invention will be described in detail based on the following figures, wherein.

DETAILED DESCRIPTION

Hereinafter, the present exemplary embodiment will be described in detail with reference to the drawings.

Figure 1:
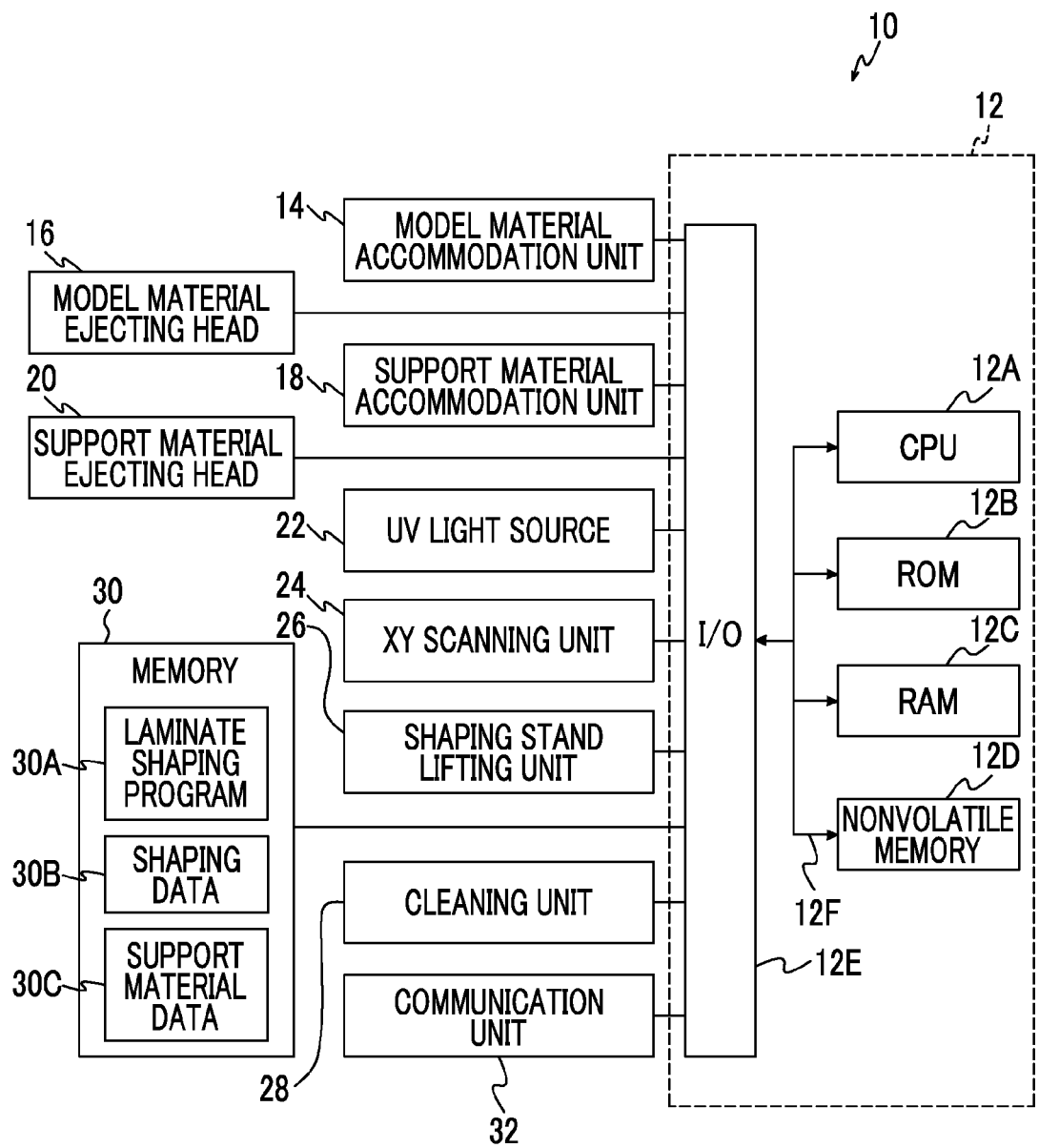
FIG. 1 is a block diagram of a laminate shaping apparatus.

FIG. 1 is a block diagram illustrating a laminate shaping apparatus 10 according to the present exemplary embodiment. As illustrated in FIG. 1, the laminate shaping apparatus 10 includes a controller 12.

The controller 12 includes a central processing unit (CPU) 12A, a read only memory (ROM) 12B, a random access memory (RAM) 12C, a nonvolatile memory 12D, and an input and output interface (I/O) 12E, which are connected to each other via a bus 12F.

The I/O 12E is connected to functional units such as a model material accommodation unit 14, a model material ejecting head 16, a support material accommodation unit 18, a support material ejecting head 20, a UV light source 22, an XY scanning unit 24, a shaping stand lifting unit 26, a cleaning unit 28, a memory 30, and a communication unit 32.

The model material accommodation unit 14 accommodates a model material for shaping a three-dimensional shaped product. The model material contains a UV curable resin or the like which is cured when irradiated with ultraviolet (UV) light, that is, ultraviolet rays, and, as the model material, for example, mixtures of acrylic monomers, isobornyl acrylate, a polymer of phenol and (chloromethyl) oxirane, 2-propenoic acid, phosphine oxides, and phenyl bis(2,4,6-trimethylbenzoyl) are used.

The model material ejecting head 16 ejects the model material which is supplied from the model material accommodation unit 14 in response to an instruction from the CPU 12A.

The support material accommodation unit 18 accommodates a support material for supporting a three-dimensional shaped product. The support material contains a UV curable resin or the like which is cured when irradiated with UV light in the same manner as the model material, and, as the support material, for example, mixtures of monomer acrylic acid, poly (oxy-1,2-ethanediyl), α-(1-oxo-2-propenyl)-ω-hydroxy, 1,2-propylene glycol, polyethylene glycol, glycerine, phosphine oxides, and phenyl bis(2,4,6-trimethyl benzoyl). However, the support material is removed after a three-dimensional shaped product is manufactured, and thus a material which is easier to be peeled off than the model material is used. In other words, the support material contains a material with lower strength when irradiated with UV light to be cured than the model material.

The UV light source 22 irradiates the model material ejected from the model material ejecting head 16 and the support material ejected from the support material ejecting head 20 with UV light in a Z axis direction so that the materials are cured. As the UV light source 22, for example, an LED, a mercury lamp, a xenon lamp, a halogen lamp, and a metal halide lamp are used, and the LED has higher directivity than that of the other light sources. For this reason, the LED is preferably used as the UV light source 22 since a distance W, described later, between the model material ejecting head 16 and the UV light source 22 is reduced to miniaturize the apparatus.

Figure 2:
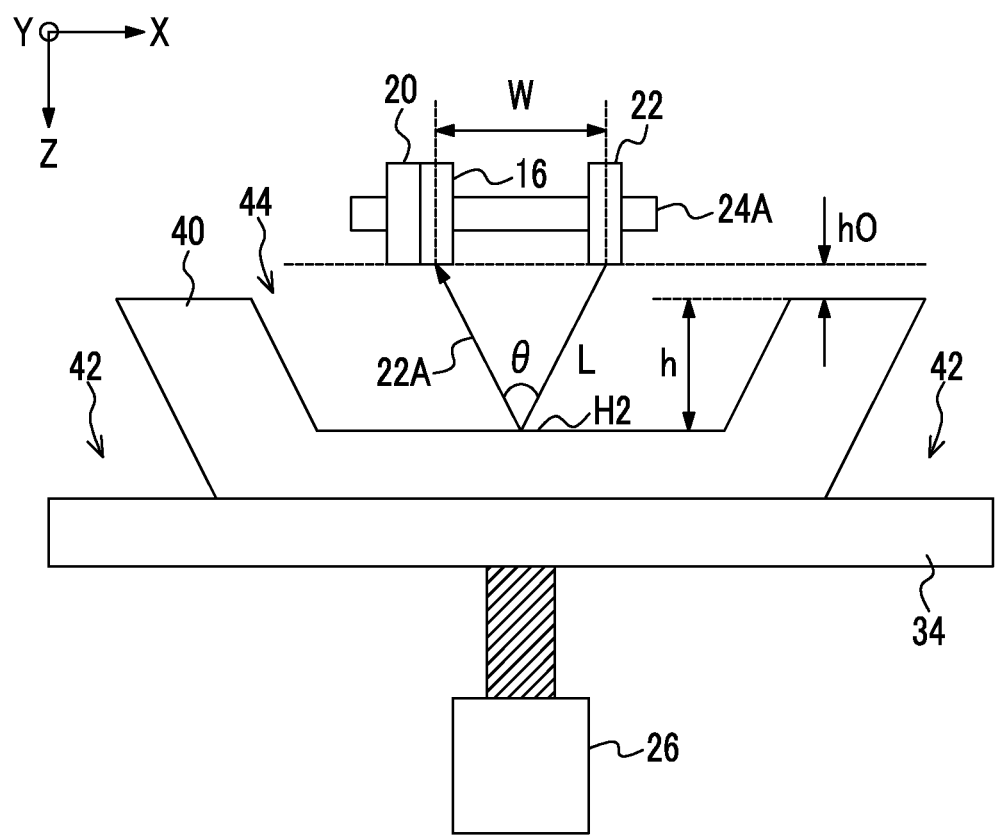
FIG. 2 is a side view of the laminate shaping apparatus.

As illustrated in FIG. 2, the model material ejecting head 16, the support material ejecting head 20, and the UV light source 22 are attached to a scanning shaft 24A provided in the XY scanning unit 24. The model material ejecting head 16 and the UV light source 22 are attached to the scanning shaft 24A with the predefined distance W therebetween. The support material ejecting head 20 is attached to the scanning shaft 24A so as to be adjacent to the model material ejecting head 16. Positions of the model material ejecting head 16 and the support material ejecting head 20 may be reversed to each other. In other words, in FIG. 2, the model material ejecting head 16 is attached on the UV light source 22 side, but the support material ejecting head 20 may be attached on the UV light source 22 side.

The XY scanning unit 24 drives the scanning shaft 24A so that the model material ejecting head 16, the support material ejecting head 20, and the UV light source 22 are moved in the X direction and the Y direction, that is, perform scanning on the XY plane.

The shaping stand lifting unit 26 moves up and down a shaping stand 34 illustrated in FIG. 2 in the Z axis direction. When a three-dimensional shaped product is manufactured, the CPU 12A controls the model material ejecting head 16, the support material ejecting head 20, and the UV light source 22 so that a model material and a support material are ejected onto the shaping stand 34, and the model material and the support material are irradiated with UV light. The CPU 12A controls the XY scanning unit 24 so that the model material ejecting head 16, the support material ejecting head 20, and the UV light source 22 perform scanning on the XY plane, and controls the shaping stand lifting unit 26 so that the shaping stand 34 is moved slowly downwards in the Z axis direction.

When a three-dimensional shaped product is manufactured, the CPU 12A controls the shaping stand lifting unit 26 so that a distance in the z axis direction from the model material ejecting head 16, the support material ejecting head 20, and the UV light source 22 to the three-dimensional shaped product on the shaping stand 34 is equal to or larger than a predefined distance h0 so that the model material ejecting head 16, the support material ejecting head 20, and the UV light source 22 are not brought into contact with the three-dimensional shaped product on the shaping stand 34.

The cleaning unit 28 has a function of cleaning materials adhered to nozzles of the model material ejecting head 16 and the support material ejecting head 20 by sucking up the materials. For example, the cleaning unit 28 is provided in a retraction region out of the scanning range of the model material ejecting head 16 and the support material ejecting head 20, and performs cleaning after the model material ejecting head 16 and the support material ejecting head 20 are retracted to the retraction region.

The memory 30 stores a laminate shaping program 30A, shaping data 30B, and support material data 30C, described later.

The CPU 12A reads and executes the laminate shaping program 30A stored in the memory 30. The laminate shaping program 30A may be recorded on a recording medium such as a CD-ROM and may be executed by being read with a CD-ROM drive or the like.

The communication unit 32 is an interface which performs data communication with an external device which outputs the shaping data 30B of a three-dimensional shaped product.

The CPU 12A manufactures a three-dimensional shaped product by controlling each functional unit according to the shaping data 30B transmitted from the external device.

Figure 3:
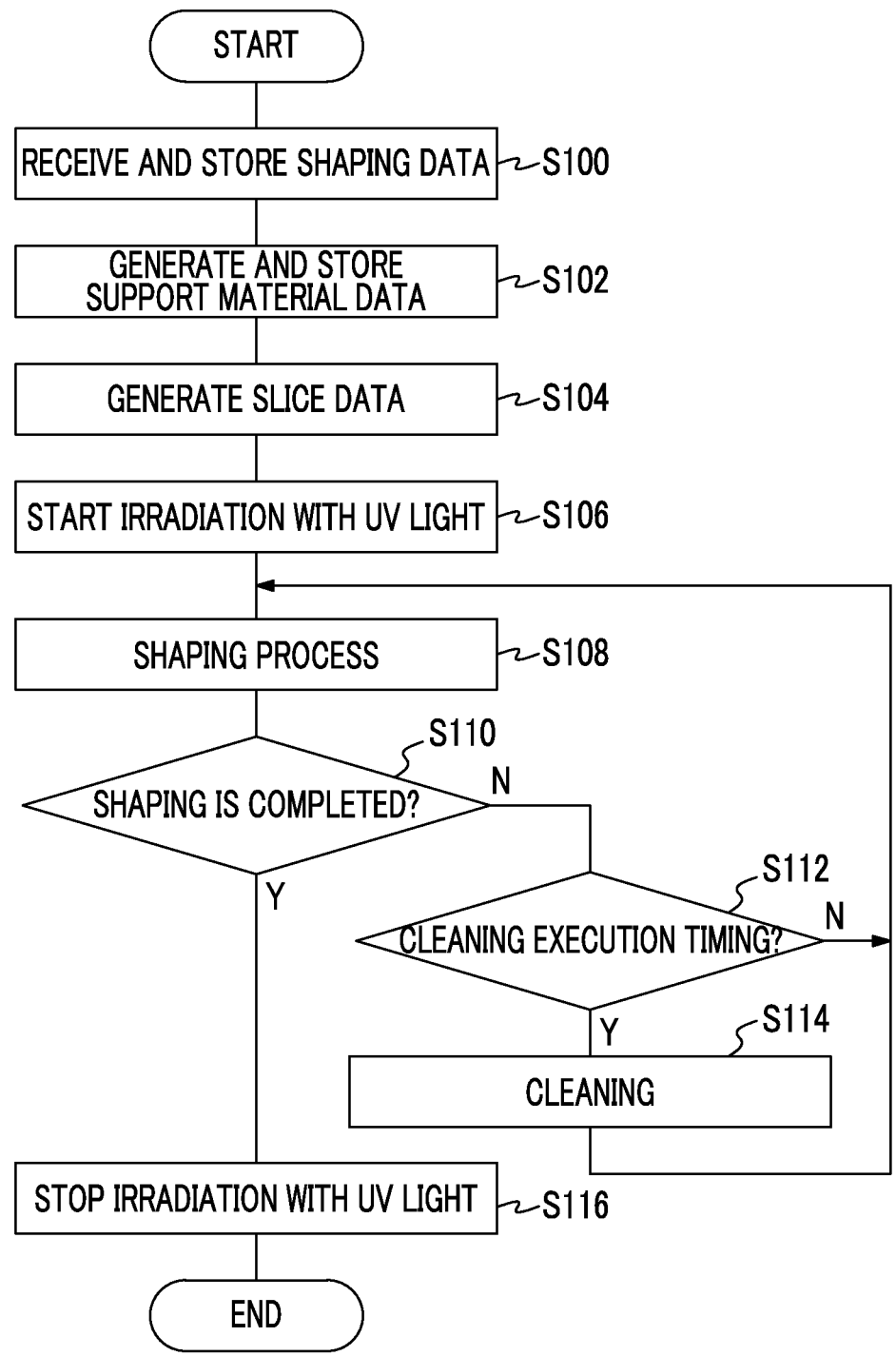
FIG. 3 is a flowchart illustrating a process performed by a controller.

Next, an operation of the present exemplary embodiment will be described. FIG. 3 is a flowchart of the laminate shaping program 30A executed by the CPU 12A. A process illustrated in FIG. 3 is executed when an instruction for manufacturing a three-dimensional shaped product is received from the external device.

Figure 4A:
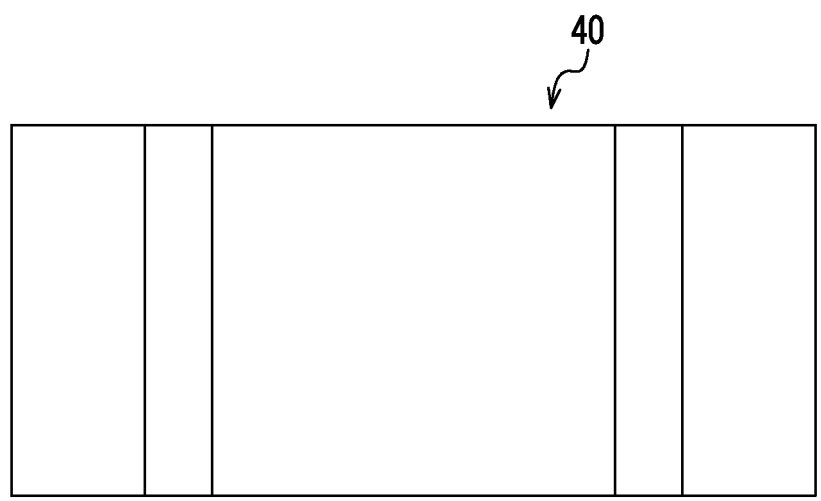
FIG. 4A is a plan view of a three-dimensional shaped product.
Figure 4B:
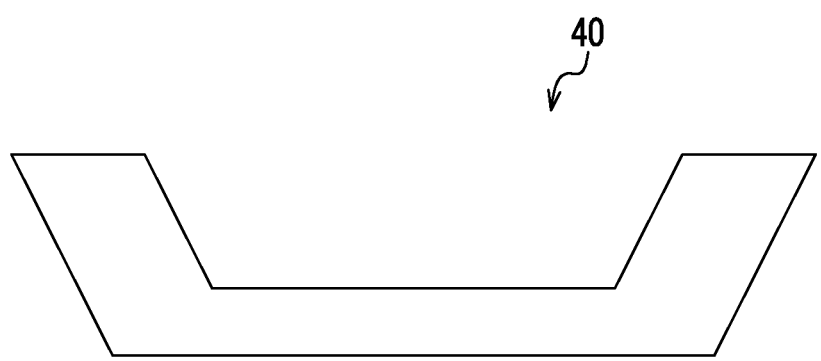
FIG. 4B is a side view of the three-dimensional shaped product.

In the present exemplary embodiment, a description will be made of a case of manufacturing a three-dimensional shaped product 40 as illustrated in FIGS. 4A and 4B as an example. FIG. 4A is a plan view of the three-dimensional shaped product 40, and FIG. 4B is a side view of the three-dimensional shaped product 40. As illustrated in FIG. 4B, when viewed from the side, the three-dimensional shaped product 40 has a shape in which both ends obliquely extend upwards from the bottom.

In step S100, the shaping data 30B of the three-dimensional shaped product 40 is received from the external device and is stored in the memory 30. As a format of the shaping data 30B of the three-dimensional shaped product 40, for example, a standard triangulated language (STL) format which is a data format for representing a three-dimensional shape is used, but a format is not limited thereto.

In step S102, the support material data 30C is generated according to the shaping data 30B received in step S100. The three-dimensional shaped product 40 is manufactured by laminating the model material on the shaping stand 34, but a region 42 which is a space on the lower side is required to be supported by the support material as illustrated in FIG. 2. For this reason, the shaping data 30B is analyzed so that the region 42 which is a space on the lower side is extracted.

As will be described later in detail, if there is a region 44 in which a height difference h is large, that is, a recessed region, as in the three-dimensional shaped product 40, this causes UV light 22A applied from the UV light source 22 to reach the model material ejecting head 16 and the support material ejecting head 20 and the model material adhered to the nozzles of the heads to be cured, and thus the nozzles become clogged. For this reason, in the present exemplary embodiment, the shaping data 30B is analyzed, and the region 44 is extracted in which a height difference is large.

The support material data 30C for ejecting the support material to the region 42 which is a space on the lower side and the region 44 in which a height difference exceeds a predefined threshold value is generated and is stored in the memory 30.

The model material ejected from the model material ejecting head 16 is cured by UV light applied from the UV light source 22, but if the UV light is reflected and scattered on a surface of the three-dimensional shaped product 40 and then reaches the model material ejecting head 16 and the support material ejecting head 20, this causes the model material adhered to the nozzles of the heads to be cured and thus the nozzles become clogged.

This becomes considerable in a case where the height difference h of the three-dimensional shaped product 40 is large as illustrated in FIG. 2. In other words, the three-dimensional shaped product 40 has a shape having the region 44 of which the center is considerably recessed, and, since a distance between the UV light source 22 and the three-dimensional shaped product 40 is increased as the model material is laminated, the UV light from the UV light source 22 easily reaches the model material ejecting head 16 and the support material ejecting head 20, and thus the nozzles tend to be clogged.

Therefore, in the present exemplary embodiment, the region 44 is embedded with the support material so that the height difference h of the three-dimensional shaped product 40 is equal to or lower than a predefined threshold value. Here, the threshold value is set to a height difference which does not allow reflected light of the UV light 22A to reach the model material ejecting head 16 and the support material ejecting head 20. This height difference is defined based on the distance W between the model material ejecting head 16 and the UV light source 22, and an illuminance upper limit value of the model material, which will be described later in detail.

In step S102, specifically, the support material data 30C for ejecting the support material to the region 44 is generated so that the following condition is satisfied.

As illustrated in FIG. 2, when the height difference between the surfaces of the three-dimensional shaped product 40 is set to h, the shortest distance from the model material ejecting head 16, the support material ejecting head 20, and the UV light source 22 to the three-dimensional shaped product 40 in the Z axis direction is set to h0, and a distance between the model material ejecting head 16 and the UV light source 22 is set to W, a distance L at which the UV light 22A applied from the UV light source 22 is reflected at the surface of the three-dimensional shaped product 40 and reaches the model material ejecting head 16 is expressed by the following equation.

$$L = 2 \times \sqrt{(h+h0)^2 + \left(\frac{W}{2}\right)^2} \quad (1)$$

The height difference h is a distance from the highest position H1 to the lowest position H2 of the recessed portion in the Z axis direction of the three-dimensional shaped product 40.

The gap h0 is a distance from the model material ejecting head 16, the support material ejecting head 20, and the UV light source 22 to the highest position H1 of the three-dimensional shaped product 40 in the Z axis direction. The CPU 12A controls the XY scanning unit 24 and the shaping stand lifting unit 26 so that a gap from the model material ejecting head 16, the support material ejecting head 20, and the UV light source 22 to the highest position H1 of the three-dimensional shaped product 40 becomes h0.

As illustrated in FIG. 2, an angle θ formed by the UV light incident to the surface of the three-dimensional shaped product 40 and the UV light reflected at the surface of the three-dimensional shaped product 40 is expressed by the following equation.

$$\theta = 2 \times \tan^{-1}((W/2)/(h+h0)) \quad (2)$$

Here, when illuminance of the UV light applied from the UV light source 22, that is, curing illuminance in which the model material is cured for a time at which irradiation is performed through scanning of the UV light source 22 is set to A (mW/cm$^2$), and a reflectance of the model material is set to r, if the illuminance of the UV light which reaches the model material ejecting head 16 is equal to or lower than a multiple of 1/r, the UV light reaching the model material ejecting head 16 has illuminance equal to or lower than the curing illuminance of the model material, and thus clogging of the head is suppressed.

Figure 5:
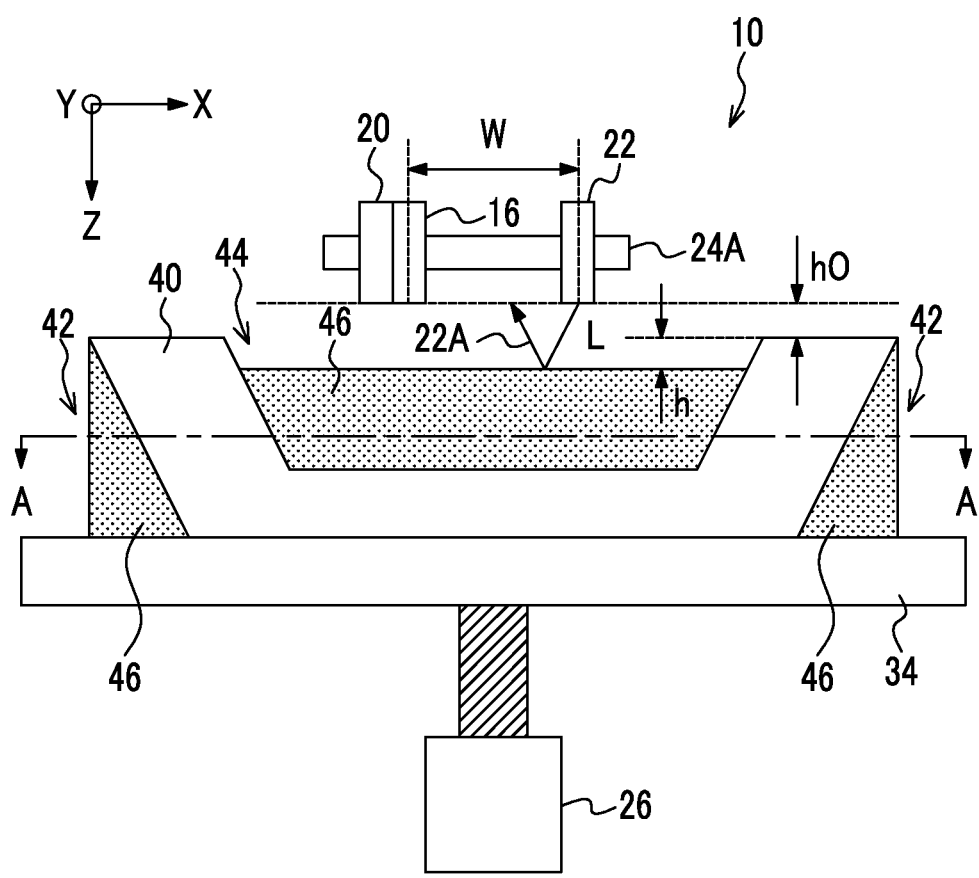
FIG. 5 is a side view of the laminate shaping apparatus.

Therefore, in the present exemplary embodiment, as illustrated in FIG. 5, a support material 46 is ejected and is embedded in the region 44 of the three-dimensional shaped product 40 so that the height difference h is reduced, and thus the UV light 22A does not reach the model material ejecting head 16. The phrase, "the UV light does not reach the model material ejecting head 16" indicates that "the UV light with intensity which causes the model material to be cured does not reach the model material ejecting head 16". Therefore, a case where UV light with intensity which does not cause the model material to be cured reaches the model material ejecting head 16 is included in the phrase, "the UV light does not reach the model material ejecting head 16". In the present embodiment, since the model material ejecting head 16 is provided on the UV light source 22 side, if the UV light does not reach the model material ejecting head 16, it is considered that the UV light also does not reach the support material ejecting head 20.

Figure 6:
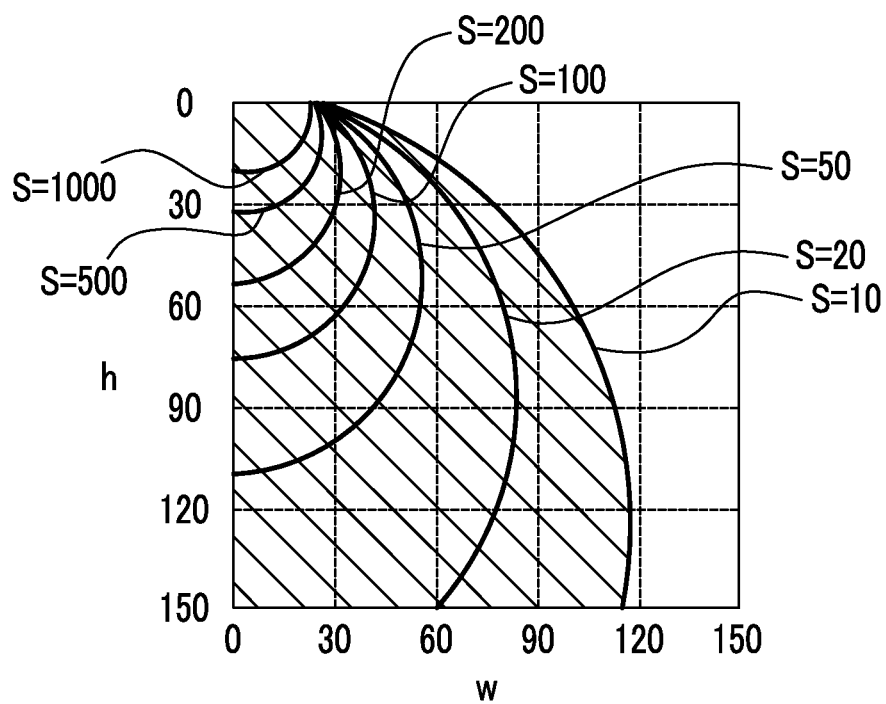
FIG. 6 is a graph illustrating an example of an illuminance distribution.

FIG. 6 illustrates that illuminance distributions of UV light are measured in respective cases where illuminance upper limit values S of the model material are 10, 20, 50, 100, 200, 500, and 1000. A transverse axis expresses the distance W between the UV light source 22 and the model material ejecting head 16 in the X direction, and a longitudinal axis expresses the height difference h.

Here, the illuminance upper limit value is an upper limit value of illuminance with which UV light may be applied in illuminance with which an UV curable resin is cured when irradiated with UV light. Since high illuminance shortens the curing time, in the present exemplary embodiment, illuminance of the UV light 22A applied by the UV light source 22 is assumed to be the illuminance upper limit value. The illuminance distributions illustrated in FIG. 6 are only an example, and are not limited thereto.

The hatched region of FIG. 6 is a region where the UV light 22A reaches the model material ejecting head 16, that is, a region where there is a concern that clogging of the head may occur, in a case where the distance L and the angle θ are expressed by the above-described Equations (1) and (2).

As illustrated in FIG. 6, in a case of using a model material with the illuminance upper limit value S=10 of UV light, the distance W is required to be about 120 mm or more so that the UV light 22A does not reach the model material ejecting head 16 regardless of the height difference h, but if the height difference h is 15 mm, the distance W may be about 60 mm.

Similarly, in a case of the illuminance upper limit value S=20 of the UV light 22A, that is, in a case of using a model material which does not cause a problem even if the UV light 22A is applied thereto up to the illuminance=20 of the UV light 22A, the distance W is required to be about 90 mm or more so that the UV light 22A does not reach the model material ejecting head 16 regardless of the height difference h, but if the height difference h is 15 mm, the distance W may be about 50 mm. As mentioned above, as the illuminance upper limit value becomes greater, the distance W for causing the UV light 22A not to reach the model material ejecting head 16 regardless of the height difference h becomes smaller. This is because, as the illuminance upper limit value becomes greater, the time to apply the UV light 22A is reduced, and accordingly the UV light 22A hardly reaches the model material ejecting head 16. The smaller the height difference h is, the shorter the distance W is.

Therefore, in the present exemplary embodiment, the support material 46 is ejected to and embedded in the region 44 so as to cause a height equal to or lower than the height difference h which is set according to the illuminance distributions which are measured in advance as illustrated in FIG. 6, that is, the height difference h which is defined based on the illuminance upper limit value of a model material to be used, and the distance W between the model material ejecting head 16 and the UV light source 22. For example, in a case where an illuminance upper limit value of a model material to be used is 10, and the distance W between the model material ejecting head 16 and the UV light source 22 is 60 mm, the support material 46 is ejected to and embedded in the region 44 so that the height difference h is 15 mm. In this case, in step S102, as illustrated in FIG. 5, the support material data 30C is generated which causes the support material 46 to be ejected to the region 44 so that the height difference h is 15 mm, and the support material 46 is ejected to the region 42.

As mentioned above, since the support material data 30C for ejecting a support material is automatically generated, a user is not required to perform an input operation such as designation of a region to which a support material is ejected.

Figure 7:
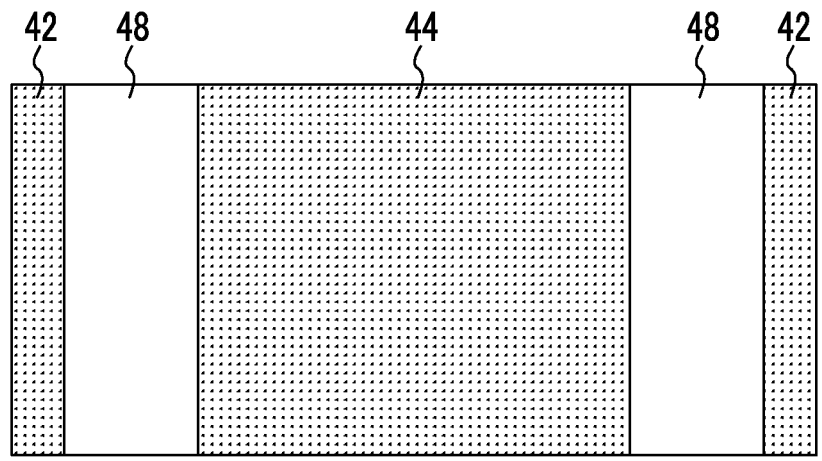
FIG. 7 is a cross-sectional view taken along the line VII-VII of FIG. 5.

In step S104, slice data is generated in which the three-dimensional shaped product 40 based on the shaping data 30B and the support material data 30C is sliced in the Z axis direction on the XY plane, that is, in the laminate direction. Therefore, plural items of slice data in which the three-dimensional shaped product 40 is sliced on the XY plane are generated in the laminate direction. For example, FIG. 7 illustrates slice data with a cross section taken along the line VII-VII of FIG. 5. As illustrated in FIG. 7, a support material for supporting a model material is ejected to the region 42, the support material 46 for reducing the height difference h is ejected to the region 44, and the model material is ejected to a region 48.

In step S106, the UV light source 22 is instructed to start irradiation with UV light. Consequently, the UV light source 22 starts irradiation with the UV light.

In step S108, a shaping process is performed. In other words, the XY scanning unit 24 is controlled so that the model material ejecting head 16 and the support material ejecting head 20 perform scanning on the XY plane; the shaping stand lifting unit 26 is controlled so that the shaping stand 34 is moved slowly downwards; and the model material ejecting head 16 and the support material ejecting head 20 are controlled so that the model material and the support material are ejected according to the slice data generated in step S104.

In step S110, it is determined whether or not shaping of the three-dimensional shaped product 40 is completed, and if the shaping is not completed, the flow proceeds to step S112. If the shaping is completed, the flow proceeds to step S116.

In step S112, it is determined whether or not a timing for performing cleaning of the model material ejecting head 16 and the support material ejecting head 20 arrives. If the timing for performing cleaning arrives, the flow proceeds to step S114. On the other hand, if the timing for performing cleaning does not arrive, the flow proceeds to step S108 in which the shaping process is continuously performed.

A timing for performing cleaning may be, for example, the time at which a predefined period elapses, or the time at which at least one of a model material and a support material is consumed in a predefined amount, but is not limited thereto.

In a case where a timing for performing cleaning is the time at which a predefined period elapses, preferably, clogging states of the heads are measured while variously changing the period, and the longest period out of periods in which clogging of the head does not occur is set. This is because, as the period becomes shorter, the number of times of cleaning is increased, and thus the time to complete the shaping process is lengthened. Consequently, wasteful execution of cleaning is minimized.

In step S114, the XY scanning unit 24 is instructed to move the model material ejecting head 16 and the support material ejecting head 20 to the retraction region, and the cleaning unit 28 is instructed to perform cleaning of the model material ejecting head 16 and the support material ejecting head 20. Consequently, the model material ejecting head 16 and the support material ejecting head 20 are moved to the retraction region, and the cleaning unit 28 cleans the model material ejecting head 16 and the support material ejecting head 20. In a case where a timing for performing cleaning is the time at which at least one of a model material and a support material is consumed in a predefined amount, only a head which ejects a material which is consumed in the predefined amount may be cleaned.

In step S116, the UV light source 22 is instructed to stop the irradiation with UV light. Consequently, the UV light source 22 stops the irradiation with UV light.

As mentioned above, in the present exemplary embodiment, the support material 46 is ejected to and embedded in the region 44 so as to cause a height equal to or lower than the height difference h, which is defined based on the illuminance upper limit value of a model material and the distance W between the model material ejecting head 16 and the UV light source 22, as the height difference h at which the UV light 22A does not reach the model material ejecting head 16.

Consequently, as illustrated in FIG. 5, the UV light 22A applied from the UV light source 22 does not reach the model material ejecting head 16, and thus clogging of the head is suppressed.

In a case where a timing for performing cleaning is the time at which a predefined period elapses, if the period is shortened, the number of times of cleaning is increased, but the head is maintained in a clean state, and thus the head may be hardly clogged. Therefore, the period may be shortened, and thus the distance W may be further reduced.

For example, as illustrated in FIG. 6, in a case of the illuminance upper limit value S=20 of the UV light, that is, in a case of using a model material which does not cause a problem even if the UV light is applied thereto up to the illuminance=20 of the UV light, the distance W is required to be about 50 mm if the height difference h is 15 mm, and thus clogging of the head is suppressed. However, if a period for performing cleaning is reduced, the distance W may be shorter than 50 mm. For example, the distance W may be reduced to about 40 mm in the above-described example.

Figure 8:
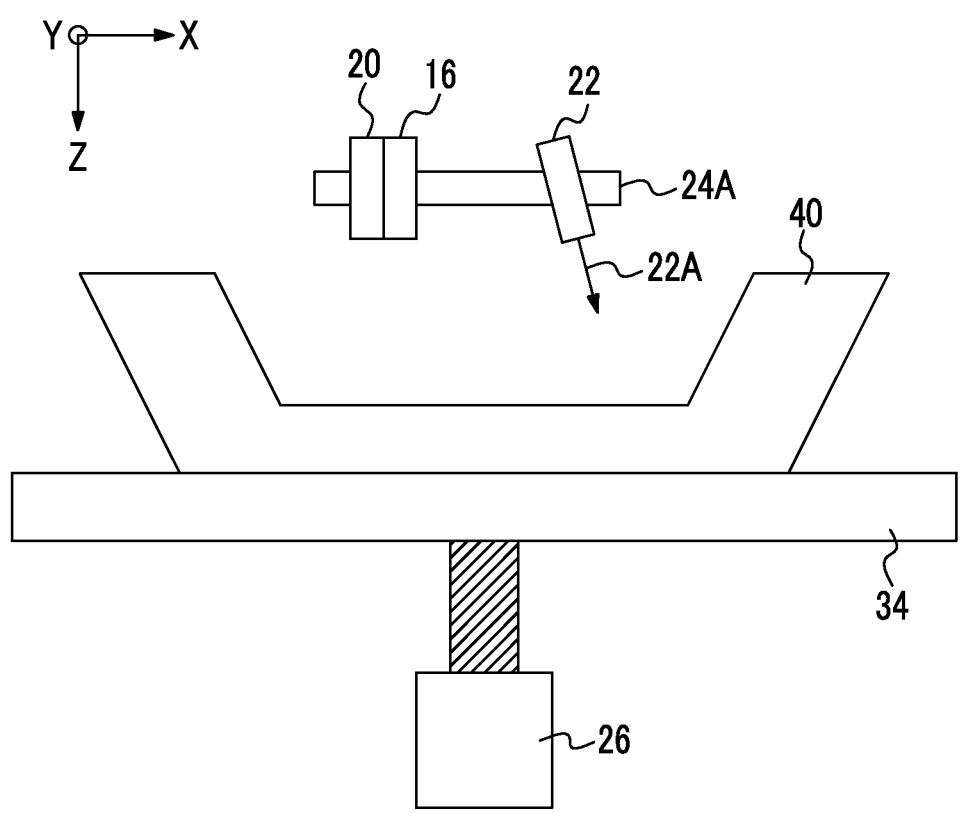
FIG. 8 is a side view of a laminate shaping apparatus related to a modification example.

As illustrated in FIG. 8, the UV light source 22 may be tilted so that an irradiation direction of the UV light 22A recedes from the model material ejecting head 16 and the support material ejecting head 20. Consequently, since reflected light hardly reaches the model material ejecting head 16, the distance W between the UV light source 22 and the model material ejecting head 16 is further reduced.

At least one of pigments and dyes may be dispersed into a support material. Consequently, reflected light, that is, light reflected at the support material, or light which is transmitted through the support material and is reflected at a model material is reduced, and thus clogging of the head is further suppressed.

An ejection timing of the support material may be regularly or irregularly changed so that a surface of a region in which the support material is embedded becomes rough. Consequently, reflected light is reduced, and thus clogging of the head is further suppressed.

Figure 9:
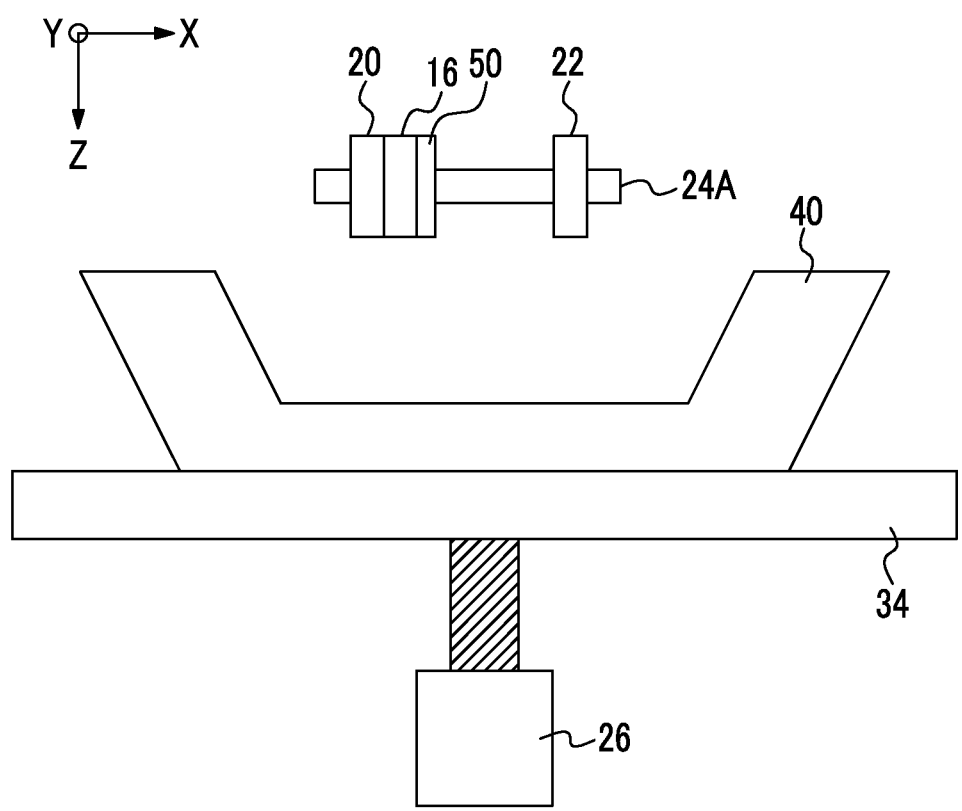
FIG. 9 is a side view of the laminate shaping apparatus related to the modification example.

As illustrated in FIG. 9, a UV sensor 50 which detects reflected light of UV light applied from the UV light source 22 is disposed to be adjacent to the model material ejecting head 16, and, in a case where intensity of the UV light detected by the UV sensor is equal to or higher than a predetermined intensity, for example, intensity which may cause a support material to be cured, the support material may be ejected. Consequently, it is suppressed to eject a support material more than necessary.

In the present exemplary embodiment, a case has been described in which the shaping stand 34 is moved slowly downwards in the Z axis direction while the model material ejecting head 16 and the like perform scanning on the XY plane, but the shaping stand 34 may be fixed to a certain position, and the model material ejecting head 16 and the like may be moved slowly upwards in the Z axis direction while performing scanning on the XY plane. Both of the two constituent elements may be moved to be separated from each other in the z axis direction.

The configuration (refer to FIG. 1) of the laminate shaping apparatus 10 described in the present exemplary embodiment is only an example, and unnecessary portions may be deleted or new portions may be added within the scope without departing from the scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A laminate shaping apparatus comprising:
   an ultraviolet-ray source that applies ultraviolet rays;
   a model material ejecting unit that ejects an ultraviolet curable model material;
   a support material ejecting unit that ejects an ultraviolet curable support material which assists shaping of a three-dimensional shaped product which is shaped by the model material;
   a driving unit that drives at least one of the ultraviolet-ray source, the model material ejecting unit, and the support material ejecting unit, and a shaping stand on which the three-dimensional shaped product is shaped; and
   a control unit that controls the model material ejecting unit, the ultraviolet-ray source, and the driving unit so that the model material is laminated on the shaping stand and is cured according to shaping data of the three-dimensional shaped product, and that controls the support material ejecting unit so that the support material is ejected on the three-dimensional shaped product to cause a height difference of the three-dimensional shaped product to be a predefined threshold value or smaller,
   wherein the height difference is a distance from a highest position to a lowest position of a recessed portion of the three-dimensional shaped product.

2. The laminate shaping apparatus according to claim 1, wherein
   the threshold value is a height difference which does not cause reflected light of the ultraviolet rays to reach the model material ejecting unit and the support material ejecting unit.

3. The laminate shaping apparatus according to claim 1, wherein
   the threshold value is defined based on a distance between the model material ejecting unit or the support material ejecting unit and the ultraviolet-ray source, in a direction intersecting an irradiation direction of the ultraviolet rays, and an illuminance upper limit value of the model material or the support material.

4. The laminate shaping apparatus according to claim 2, wherein
   the threshold value is defined based on a distance between the model material ejecting unit or the support material ejecting unit and the ultraviolet-ray source, in a direction intersecting an irradiation direction of the ultraviolet rays, and an illuminance upper limit value of the model material or the support material.

5. The laminate shaping apparatus according to claim 1, further comprising:
   a generation unit that generates support material ejection data for ejecting the support material.

6. The laminate shaping apparatus according to claim 2, further comprising:
   a generation unit that generates support material ejection data for ejecting the support material.

7. The laminate shaping apparatus according to claim 3, further comprising:
   a generation unit that generates support material ejection data for ejecting the support material.

8. The laminate shaping apparatus according to claim 4, further comprising:
   a generation unit that generates support material ejection data for ejecting the support material.

9. The laminate shaping apparatus according to claim 1, wherein
   the ultraviolet-ray source is tilted so that the irradiation direction of the ultraviolet rays recedes from at least one of the model material ejecting unit and the support material ejecting unit.

10. The laminate shaping apparatus according to claim 2, wherein
    the ultraviolet-ray source is tilted so that the irradiation direction of the ultraviolet rays recedes from at least one of the model material ejecting unit and the support material ejecting unit.

11. The laminate shaping apparatus according to claim 3, wherein
    the ultraviolet-ray source is tilted so that the irradiation direction of the ultraviolet rays recedes from at least one of the model material ejecting unit and the support material ejecting unit.

12. The laminate shaping apparatus according to claim 4, wherein
    the ultraviolet-ray source is tilted so that the irradiation direction of the ultraviolet rays recedes from at least one of the model material ejecting unit and the support material ejecting unit.

13. The laminate shaping apparatus according to claim 5, wherein
    the ultraviolet-ray source is tilted so that the irradiation direction of the ultraviolet rays recedes from at least one of the model material ejecting unit and the support material ejecting unit.

14. The laminate shaping apparatus according to claim 6, wherein
    the ultraviolet-ray source is tilted so that the irradiation direction of the ultraviolet rays recedes from at least one of the model material ejecting unit and the support material ejecting unit.

15. The laminate shaping apparatus according to claim 7, wherein the ultraviolet-ray source is tilted so that the irradiation direction of the ultraviolet rays recedes from at least one of the model material ejecting unit and the support material ejecting unit.

16. The laminate shaping apparatus according to claim 8, wherein the ultraviolet-ray source is tilted so that the irradiation direction of the ultraviolet rays recedes from at least one of the model material ejecting unit and the support material ejecting unit.

17. The laminate shaping apparatus according to claim 1, further comprising:
an ultraviolet detecting unit that detects the ultraviolet rays,
wherein, when intensity of the ultraviolet rays detected by the ultraviolet detecting unit is equal to or higher than a predefined intensity, the control unit controls the support material ejecting unit so that the support material is ejected.

18. The laminate shaping apparatus according to claim 1, wherein
the control unit controls the support material ejecting unit so that an ejection timing of the support material is changed and a region where the support material is ejected has a rough surface.

19. The laminate shaping apparatus according to claim 1, wherein
the support material contains at least one of pigments and dyes.

* * * * *